United States Patent [19]

Saito et al.

[11] Patent Number: 4,730,315
[45] Date of Patent: Mar. 8, 1988

[54] DIAGRAMMATIC METHOD OF TESTING PROGRAM

[75] Inventors: Kazumasa Saito, Kawasaki; Hiroyuki Maezawa, Sagamihara, both of Japan

[73] Assignee: Hitachi, Ltd., Tokyo, Japan

[21] Appl. No.: 787,386

[22] Filed: Oct. 15, 1985

[30] Foreign Application Priority Data

Oct. 17, 1984 [JP] Japan .................................. 59-216146

[51] Int. Cl.$^4$ .............................................. G06F 11/00
[52] U.S. Cl. ...................................... 371/19; 364/200; 364/300
[58] Field of Search ........................................ 371/19; 364/200 MS File, 900 MS File, 300

[56] References Cited

U.S. PATENT DOCUMENTS

| | | | |
|---|---|---|---|
| 4,315,315 | 2/1982 | Kossiakoff | 364/516 X |
| 4,455,619 | 6/1984 | Masui | 364/900 |
| 4,533,997 | 8/1985 | Furgerson | 371/19 X |

OTHER PUBLICATIONS

L. L. Zimmerman, "On-Line Program Debugging-A Graphic Approach", *Computers & Automation*, 11/1967, pp. 30, 31, 34.

*Primary Examiner*—Jerry Smith
*Assistant Examiner*—Robert W. Beausoliel, Jr.
*Attorney, Agent, or Firm*—Antonelli, Terry & Wands

[57] ABSTRACT

A diagrammatic method is disclosed of testing a program in a data processing system equipped with a display terminal for interactive operations. Program specification inputs are given in a diagrammatic form through interactive operations and are edited into diagrammatic specifications. Those diagrammatic specifications are then translated into a source program described in, for example, FORTRAN, in which are interspersed comment statements each of which indicates a diagrammatic specification corresponding to the associated statement of the source program. In the course of a test the diagrammatic specification corresponding to a process under execution is retrieved and displayed according to a comment statement, and the portions corresponding to executed operations are displayed distinctively, for example, in a special color, while the resultant values of variables are also displayed.

10 Claims, 7 Drawing Figures

FIG. 5

```
         SUBROUTINE    SUB (C,D)
(1) C*   S    PROC  1   SUB
         COMMON    AB , XY
(2) C*   IF   SUB
         INTEGER * 8  AB, XY
    C*   IF   SUB
         INTEGER * 8   I, L
(3) C*   IN   SUB
         REAL * 4    M
    C*   IN   SUB
         INTEGER * 4   C, D
    C*   IF   SUB
         DO   10   I = 1 , 5
(4) C*   P    SUB   10
         J = I * L
    C*   P    SUB   20
      10 CONTINUE
    C*   P    SUB   10
         IF ( M. LE. 0 ) GO TO 20
    C*   P    SUB   30
         J = J + 5
    C*   P    SUB   40
              :
              :
```

DIAGRAMMATIC METHOD OF TESTING PROGRAM

BACKGROUND OF THE INVENTION

This invention relates to the testing of a program, and more specifically to a method of testing a program utilizing diagrammatic representations of the program displayed on a display terminal for interactive use.

For testing a program it has been known to perform a test on the source text, for which a programmer embeds debug information in the source text or runs a debugger to set a test condition. When an error is found a correction of the source text followed by a retest is repeated. This test is centered on the source text, and such procedures as described above are troublesome and inefficient.

A method of making diagrammatically represented program specifications through interactive operations and then automatically generating a source program has been proposed in our copending U.S. patent application Ser. No. 695,229 "Method of Automatically Generating Source Program", filed Jan. 25, 1985, which greatly facilitates the production of source programs. It would be very convenient if such diagrammatic representation could be utilized directly in a program test.

SUMMARY OF THE INVENTION

It is therefore an object of the present invention to lighten the burden of a program test as described above.

It is another object of the present invention to improve the efficiency of a program test and allow a test executer to test and debug without being conscious of the source program.

It is another object of the present invention to provide a program testing method by which the state of the test can be observed visually on diagrams.

It is a further object of the present invention to provide a program testing method by which the execution route and the change of the values of variables can be traced visually on diagrams displayed on a display screen.

According to this invention, the diagrammatic specifications of a program are drawn up by a diagram editing process through interactive operations using a display terminal, and those diagrammatic specifications are then translated automatically into a source program in which is interspersed information indicating diagrammatic specifications corresponding to respective portions of the source program. In a test executing phase a test condition is set and a test is executed. In the course of the execution of the test the diagrammatic specification corresponding to the source program portion under execution is displayed, on which the state of the test is indicated.

By virtue of this invention a source program is automatically generated from diagrammatic specifications drawn up through interactive operations and the progress of the test of the program thus generated can be monitored on diagrammatic specifications. The correction of errors and retest can be carried out in the same manner. Thus the whole process from designing to testing can be carried out on diagram which are easy to comprehend, with a result that programmers are released from source lists. The diagrammatic specifications, when completed, may be printed out for use as program specifications.

DESCRIPTION OF THE DRAWINGS

FIG. 5 illustrates examples of the information embedded in a source program;

DESCRIPTION OF THE PREFERRED EMBODIMENT

Figure 1:
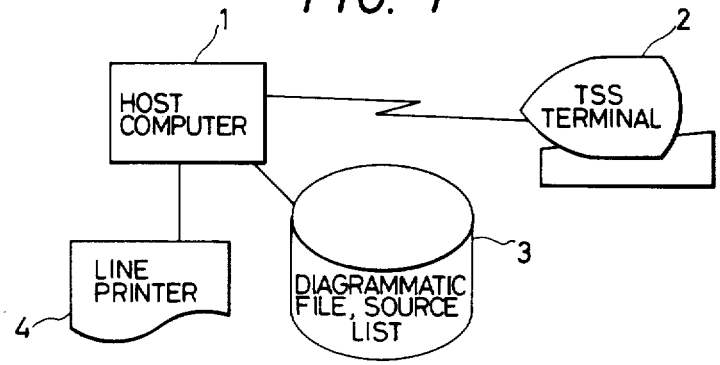
FIG. 1 is a schematic block diagram of a data processing system in which the present invention may be practiced.

FIG. 1 shows a data processing system in which the present invention may be used. In the figure reference numeral 1 denotes a host computer which performs various information processings, 2 denotes a TSS terminal which comprises a keyboard and a graphic display and communicates with the host computer 1 via appropriate lines in an interactive manner, 3 denotes a file which stores diagrammatic specification information produced or revised by means of the TSS terminal 2, as well as source programs generated automatically from diagrammatic specifications, and 4 denotes a line printer for output.

Figure 2:
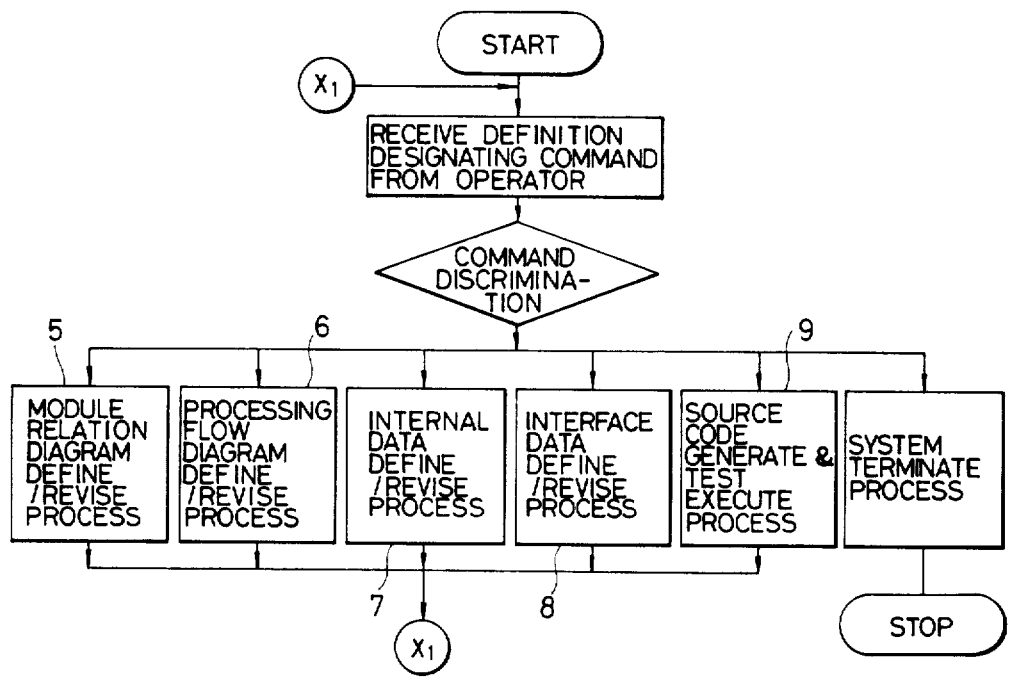
FIG. 2 is a flowchart giving an outline of the processing according to the present invention.

FIG. 2 shows in a flowchart form an outline of the process carried out by the host computer 1 according to the present invention. The process branches according to an operator's direction to: a process 5 for defining or revising a module relation diagram, a process 6 for defining or revising a processing flow diagram, a process 7 for defining or revising internal data, a process 8 for defining or revising interface data, or a process 9 for generating a source code and executing a test. The processes 5 through 8 constitue a diagram editing process carried out by interactive operations making use of the keyboard and graphic display of the TSS terminal 2.

Figure 3:
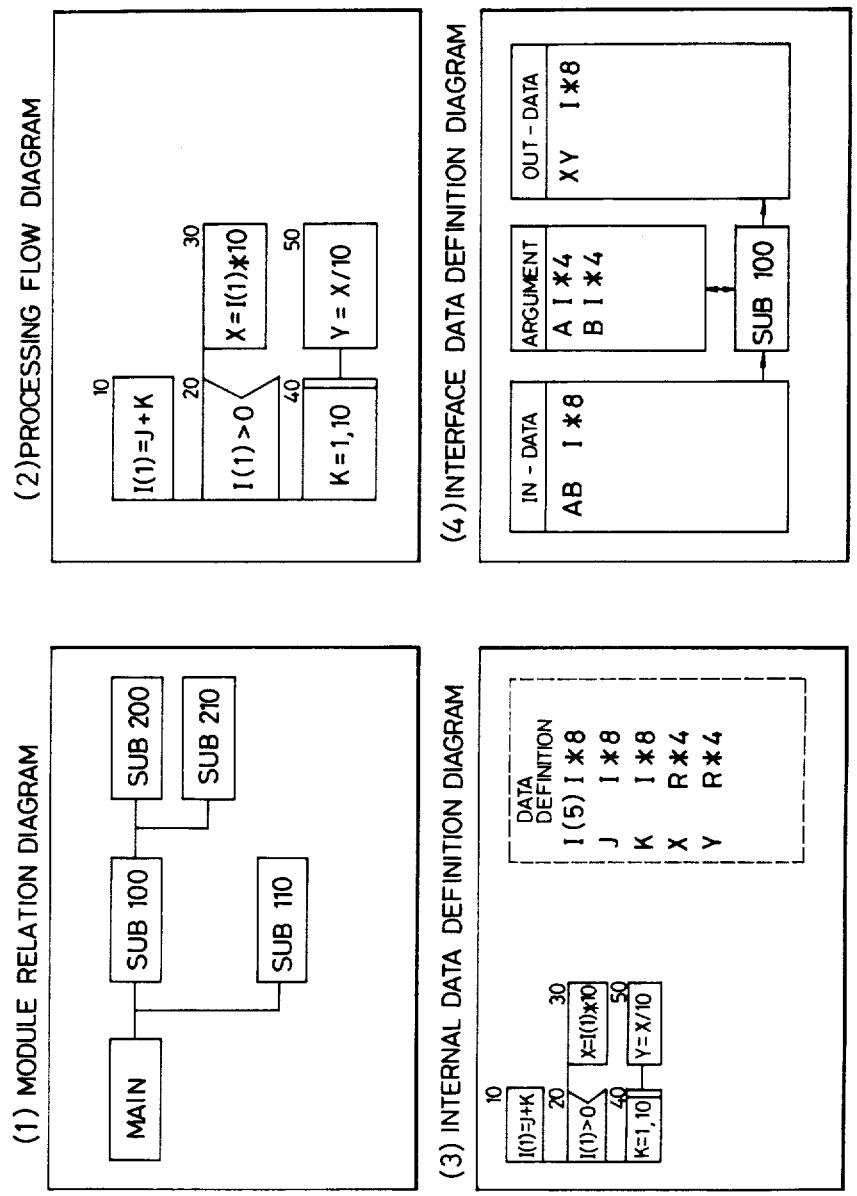
FIG. 3 illustrates examples of the formats of displayed diagrammatic specifications according to the present invention.

Examples of the formats on the display screen of the respective diagrammatic specifications drawn by the processes 5 through 8 are shown in (1) through (4) of FIG. 3. FIG. 3 (1) shows a module relation diagram which represents the interconnection relation among source program modules to be generated. FIG. 3 (2) shows a processing flow diagram which represents the logical flow of processing within a module, the example shown there being drawn according to PAD (Problem Analysis Diagram). PAD employs three types of boxes which are interconnected to represent a processing flow. A simple rectangular box represents a sequential process, and a rectangular box with a vertical line in the right end portion represents the repetitive execution of the process of a box connected on the right, while a rectangular box with a notch at the right end represents a decision indicating that the process of a box connected to the upper right corner or of one connected to the lower right corner is alternatively executed depending upon the selecting condition. Processing proceeds generally from top to bottom. FIG. 3 (3) shows an internal data definition diagram which defines the array size or dimension, type, etc. of data used in the process of the associated processing flow diagram. FIG. 3 (4) shows an interface data definition diagram which defines in boxes titled "ARGUMENT", "IN-DATA" and "OUT-DATA", in a manner similar to that for internal data, the variable name, type, array size, etc. of arguments for module call, common data to be referred between modules, and common data to be updated, respectively. Those diagrammatic specifications (1) through (4) thus drawn up are stored as diagrammatic information in the file 3, and subsequently used by the source code generating process 9 automatically to generate a source program.

Figure 4:
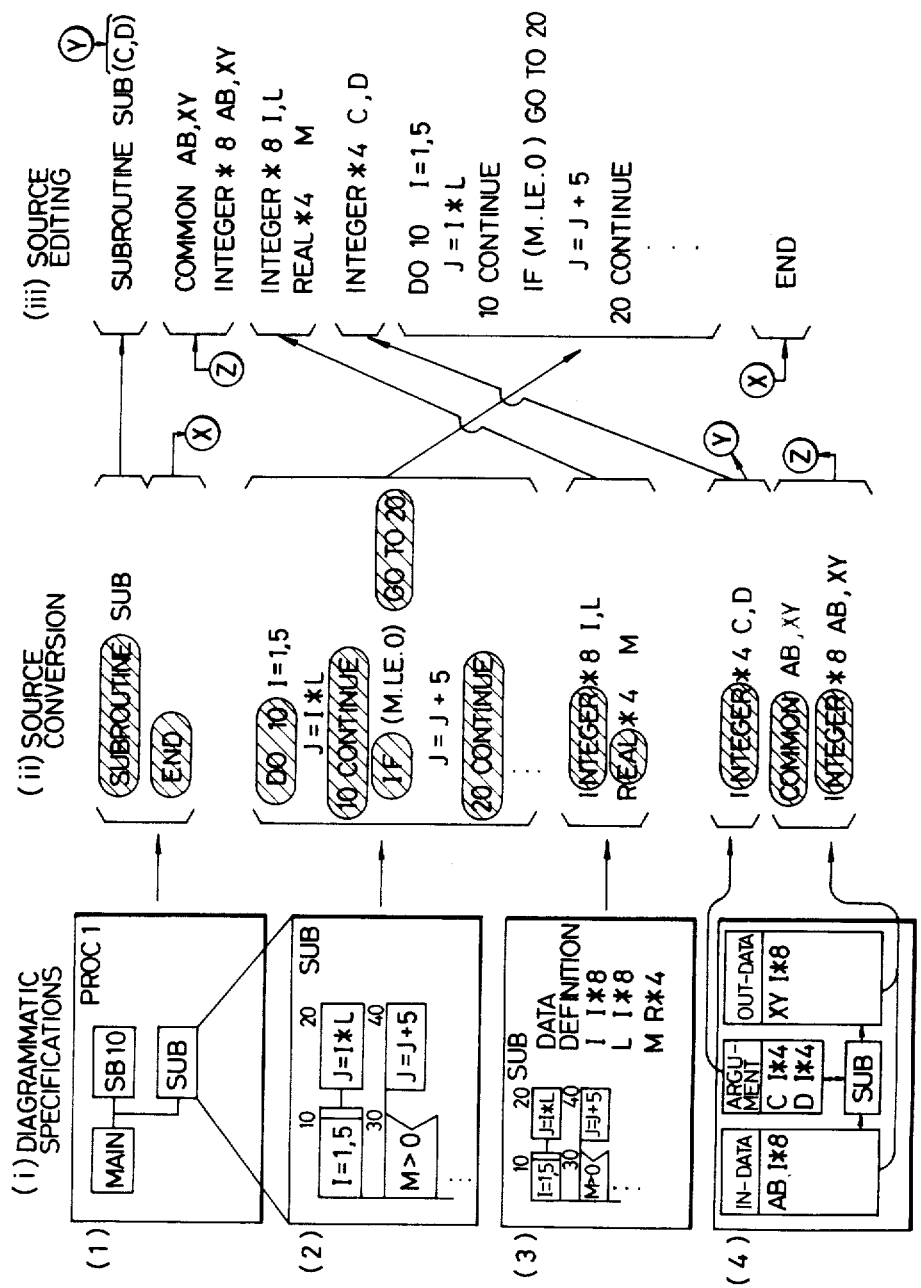
FIG. 4 illustrates an example of the source code conversion process according to the present invention.

FIG. 4 shows an example for the procedure of generating a source program from those four kinds of diagrammatic specifications. For the example shown in the figure it is assumed that a module "SUB" in a module relation diagram (1) of (i) DIAGRAMMATIC SPECIFICATIONS has its associated processing flow diagram (2), internal data definition diagram (3) and interface data definition diagram (4) prepared as shown, and that a source program described in FORTRAN is to be generated therefrom. The generating process is roughly divided into two stages, namely, (ii) SOURCE CONVERSION and (iii) SOURCE EDITING.

In the first stage, by the process of (ii) SOURCE CONVERSION, individual source statements are generated, as indicated by arrows, from the diagrammatic specifications (1) through (4) of (i). In the figure encircled and hatched portions are added automatically by the conversion process. Those are key words, symbols, etc. which are predetermined according to the description rule of the designated programming language. In the example of FIG. 4 key words such as "DO", "CONTINUE", "IF", etc. in processing statements and "INTEGER", "REAL", "COMMON", etc. for defining data types are conformed to the description rule of FORTRAN.

In the second stage the process of (iii) SOURCE EDITING rearranges the source statements obtained in the first stage in an appropriate order according to the description rule of the programming language so as to form a program unit. In FORTRAN a compile unit begins with "SUBROUTINE" and ends with "END", between which are placed orderly, according to the rule, data specification statements first, and then processing statements to complete a program. In the figure, arrows indicate where respective source statements are moved to by the source editing process. A more detailed description of the processes described heretofore is given in the above-mentioned co-pending application.

In order to perform a test on diagrams, information necessary for retrieving and displaying relevant diagrammatic specifications is added to the source code generated by the above-described process. FIG. 5 shows examples of such information added to that source code which is generated by the process (iii) of FIG. 4. In the figure underlines denote the information thus added. Each of those added codes begins with "C*", and corresponds to a comment statement in the FORTRAN language. A line of source statement is accompanied with a line of comment statement indicating the diagrammatic specification from which the preceding source statement has been converted. Key words "S", "PROC 1" and "SUB" in line (1) represent the conversion of a module named SUB in a module relation diagram named PROC 1, where "S" stands for "module relation diagram". "IF" and "SUB" in line (2) represent the IF, that is, interface data definition diagram for the module SUB. In like manner, line (3) represents the interface data definition diagram for the module SUB. Line (4) represents the box No. 10 in the P, that is, processing flow diagram for the module SUB, the numeral "10" at the tail indicating a box number. In the processing flow diagram (2) of (iii) DIAGRAMMATIC SPECIFICATIONS in FIG. 4, a number shown on the upper right of each box is a box number. The correspondence of the source statements to the diagrammatic specifications is thus indicated by comment statements. Those comment statements are generated by the process of (ii) SOURCE CONVERSION in FIG. 4 according to the diagrammatic specifications as the source, and are moved together with their associated source statements by the process of (iii) SOURCE EDITING. That series of processes for generating a source program with information indicating the corresponding diagrammatic specifications embedded therein constitute a diagram translating process.

Figure 6:
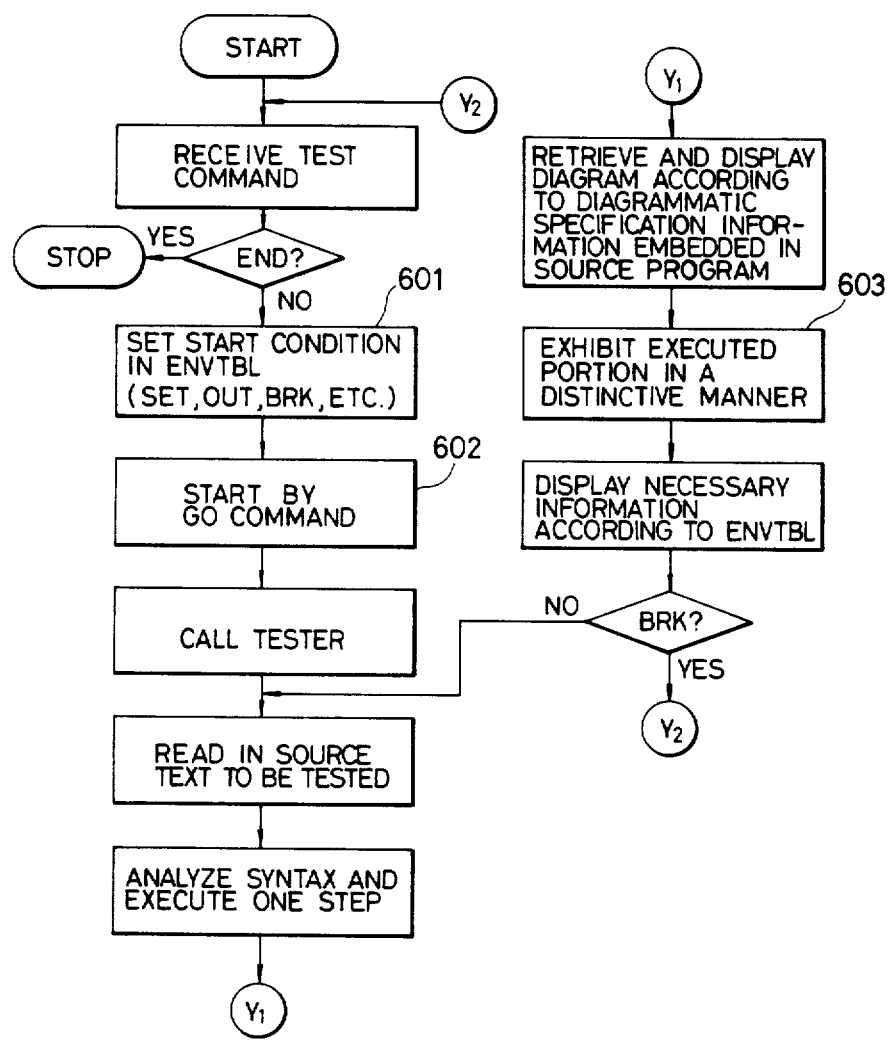
FIG. 6 is a flowchart illustrating the test execution process according to the present invention.

FIG. 6 is a flowchart showing a processing sequence for the execution of a test. Condition setting commands, such as SET (set value), OUT (output data contents), BRK (break point), etc., establishes the environment of the test in an environment table (ENVTBL) (601), and a GO command starts the test (602). The processing flow diagram under execution is retrieved and displayed, and the executed boxes are exhibited in a distinctive manner (e.g., brighter than before, in another color, in hatching, etc.) so as to show which part is being executed (603). The resultant change of data is also displayed on the screen.

Figure 7:
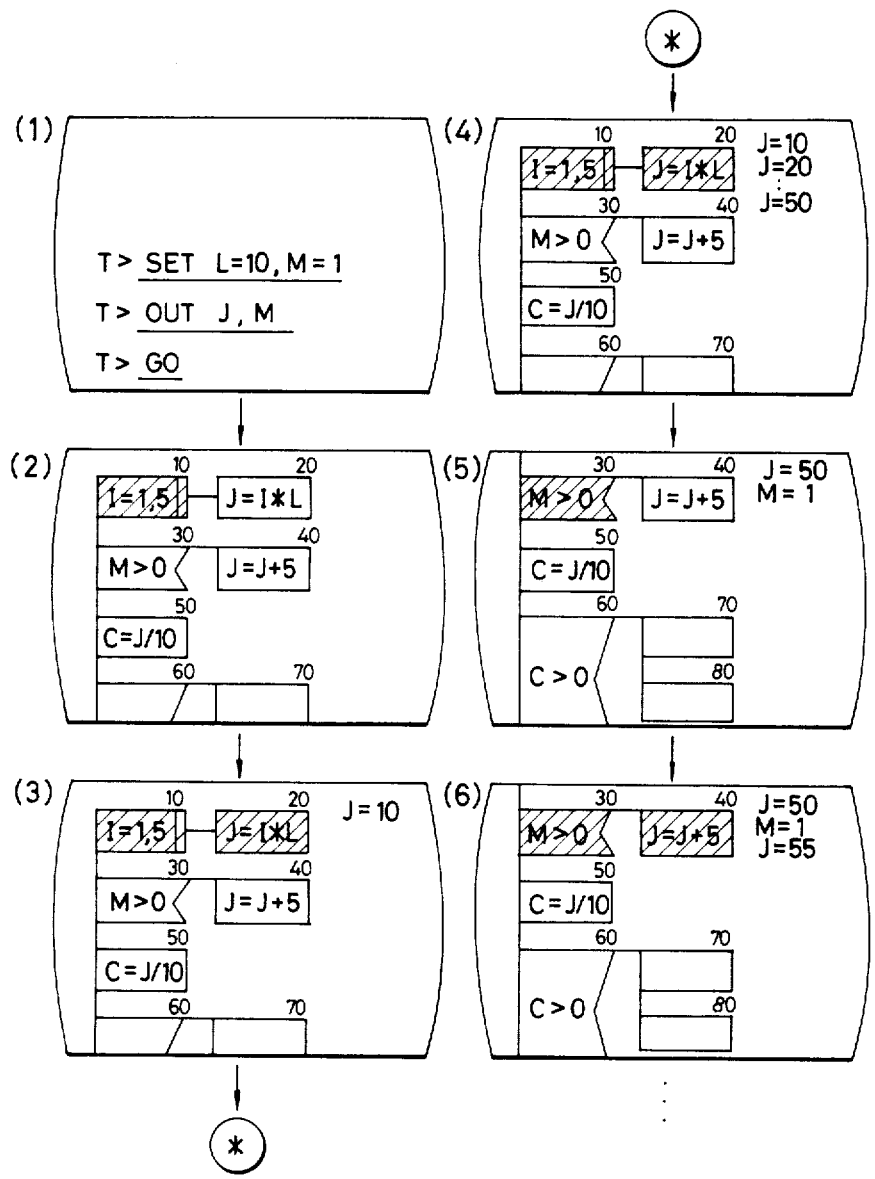
FIG. 7 illustrates an example of the transition of a displayed scene during the execution of a test according to the present invention.

FIG. 7 illustrates an example of the transition of a scene on the display screen during the execution of a test. On screen (1) a condition is set prior to the start of the test. Variables L and M are set to the values of 10 and 1, respectively, and the output ("OUT") of the contents of variables J and M is specified. Then a GO command causes the test to start. Subsequently the scene changes in the order of (2), (3), (4), (5), (6), and so on, in which every executed portion (box) is distinctively displayed (shown by hatching in the figure) each time. On screen (4) an operation "J=I*L" is executed five times according to a repetition condition "I=1, 5", and the resultant values of J are displayed on the right of the corresponding box with a new value being added each time the value is updated.

If an error or a bug is found, the erroneous point of a diagrammatic specification is corrected by appropriate one of the processes 5 through 8 in FIG. 2, and then the source generation and test by the process 9 is executed again. After it is ascertained that a program works correctly, its associated diagrammatic specifications may be printed out via the line printer 4 in FIG. 1 to be adopted as program specifications without further elaboration, thereby completely avoiding the trouble of manually drawing and correcting specifications.

What is claimed is:

1. A program testing method performed in a data processing system having processing means, memory means, inputting means and outputting means, comprising the steps of:
    storing in said memory means data representing diagrammatic specifications of a program and a corresponding series of program statements having correspondence information associated therewith which indicates the correspondence of said program statements to respective portions of said diagrammatic specifications;

starting execution of said series of program statements;

identifying during said execution a portion of said diagrammatic specifications corresponding to a program statement in a path of said execution by referring to said correspondence information; and outputting during said execution at least part of said data representing diagrammatic specifications with said identified portion expressed distinctively, thereby showing the execution state of said series of program statements on said diagrammatic specifications.

2. A method according to claim 1, wherein said diagrammatic specifications include a diagram representing a modular structure of said program and a diagram representing a proceasing flow within each module of said program, and said correspondence information indicates the correspondence of said program statements to constituent members of said diagram.

3. A method according to claim 2, wherein at least one of said diagrams comprises as the constituent members a plurality of interconnected symbols of varying types preassigned to respective types of processing, and an identified one of said symbols is distinctively expressed in said outputting step.

4. A method according to claim 1, wherein said correspondence information consists of a plurality of comment statements, and further comprising the steps of generating said comment statements from said diagrammatic specifications, and editing said comment statements and said program statements in pairs according to the description rule of a designated programming language.

5. A method according to claim 1, wherein said starting step starts a test of said series of program statements by setting a test condition and starting a test routine.

6. A method according to claim 5, wherein said test is carried out on step by step basis, and said identifying step and outputting step are carried out after each step of the test.

7. A method according to claim 1, wherein said outputting step further outputs values of variable brought forth by said execution.

8. A method according to claim 1, wherein said program to be generated is a source program.

9. A method according to claim 1, wherein said method is carried out through interactive operations.

10. A method according to claim 9, wherein said interactive operations are carried out via a graphic terminal provided in place of said inputting means and outputting means.

* * * * *